United States Patent
Szelong et al.

(10) Patent No.: US 9,036,341 B2
(45) Date of Patent: May 19, 2015

(54) DRIVE CARRIER

(75) Inventors: Michael Szelong, Sunnyvale, CA (US); Keith Son, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 1099 days.

(21) Appl. No.: 11/506,117

(22) Filed: Aug. 17, 2006

(65) Prior Publication Data

US 2007/0206351 A1    Sep. 6, 2007

Related U.S. Application Data

(60) Provisional application No. 60/778,115, filed on Mar. 1, 2006.

(51) Int. Cl.
*G06F 1/16* (2006.01)
*G06F 1/18* (2006.01)

(52) U.S. Cl.
CPC . *G06F 1/18* (2013.01); *G06F 1/187* (2013.01)

(58) Field of Classification Search
USPC .......... 361/683, 685, 679.33, 679.01, 679.02, 361/724–727
See application file for complete search history.

(56) References Cited

U.S. PATENT DOCUMENTS

| | | | | |
|---|---|---|---|---|
| 2,858,389 | A * | 10/1958 | Cuorato et al. | 200/50.26 |
| 5,622,511 | A * | 4/1997 | Jarrett | 439/248 |
| 5,993,241 | A * | 11/1999 | Olson et al. | 439/378 |
| 6,005,208 | A * | 12/1999 | Castonguay | 200/308 |
| 6,067,225 | A | 5/2000 | Reznikov et al. | 361/685 |
| 6,293,828 | B1 * | 9/2001 | Colver et al. | 439/680 |
| 6,381,139 | B1 * | 4/2002 | Sun | 361/725 |
| 6,480,391 | B1 * | 11/2002 | Monson et al. | 361/752 |
| 6,483,107 | B1 * | 11/2002 | Rabinovitz et al. | 250/239 |
| 6,490,153 | B1 * | 12/2002 | Casebolt et al. | 361/685 |
| 6,699,128 | B1 | 3/2004 | Beadell et al. | 463/46 |
| 6,754,074 | B2 | 6/2004 | McClelland, II et al. | 361/690 |
| 6,762,934 | B2 * | 7/2004 | Kitchen et al. | 361/685 |
| 6,876,547 | B2 | 4/2005 | McAlister | 361/685 |
| 7,035,096 | B2 * | 4/2006 | Franz et al. | 361/685 |
| 7,251,132 | B1 * | 7/2007 | Paul et al. | 361/685 |
| 7,382,624 | B2 * | 6/2008 | Barsun et al. | 361/730 |
| 2002/0104396 | A1 * | 8/2002 | Megason et al. | 74/109 |
| 2005/0174743 | A1 * | 8/2005 | Downing et al. | 361/725 |
| 2006/0002093 | A1 * | 1/2006 | Carlson et al. | 361/726 |

* cited by examiner

*Primary Examiner* — Adrian S Wilson
(74) *Attorney, Agent, or Firm* — Klein, O'Neill & Singh, LLP

(57) ABSTRACT

A chassis assembly and method for including a component carrier in an electronic device. The assembly may include a carrier for housing a component for integration into the system. The carrier includes a frame constructed to at least partially contain the electronic portions of the component. A handle is pivotally coupled to the frame. The handle may rotate between an engaging orientation and a securing orientation. A pinion portion is included on the handle. The pinion portion may engage with a corresponding rack formed in the chassis to control movement of the carrier with respect to the chassis. A securing mechanism is disposed on an end of the handle opposite the pinion portion. The securing mechanism may be implemented to secure the handle in a securing orientation wherein the end of the handle, generally opposite the pinion portion, is disposed adjacent the frame. A securing mechanism such as a latch may be included to prevent rotation of the handle with respect to the frame.

18 Claims, 5 Drawing Sheets

DRIVE CARRIER

CROSS REFERENCE TO RELATED APPLICATIONS

The present application claims the benefit of U.S. Provisional Application Ser. No. 60/778,115 filed Mar. 1, 2006. Said U.S. Provisional Application Ser. No. 60/778,115 filed Mar. 1, 2006 is hereby incorporated by reference in its entirety.

FIELD OF THE INVENTION

The present invention relates to the field of information handling system hardware and particularly to a chassis and drive carrier configured to prevent inadvertent damage associated with coupling and/or uncoupling of components.

BACKGROUND OF THE INVENTION

Electronic devices including information handling systems and data storage system utilize components which permit interchanging and replacement of components. Components may be replaced with another component having similar functionality, while offering increased performance characteristics, or to replace a component having a failure. As a result, during the course of the life of an electronic device, numerous component changes may be made to correct component failure or to enhance the functionality of the electronic device. Due to high user reliance on these systems, users often wish to have the system updated or a failure corrected in-situ or on premises. Field repair or replacement conditions may be less than ideal for performing such removal/insertion of components.

Proper removal and replacement of components is important as proper seating (both physical and communicative) of components ensures compliance with design requirements for communicative/electrical coupling of the components. Improper connection may lead to component connectivity issues. Improper coupling of components may damage the connections or the devices themselves. One example of this problem is coupling a data storage device to a midplane or backplane included in a data storage system. Pin/blade couplings may be inadvertently damaged should improper alignment occur. If, a user removing or inserting a component applies too much force, the component or a connector for communicatively/electrically coupling the component within the system may become damaged and require replacement. A user rapidly seating a hard drive in a data storage device may inadvertently damage the midplane, backplane or drive connector by bending communication pins or blades on the devices. Even if repair is possible, the damage may affect communication performance for the repaired system or the damage may cause intermittent problems which may not be readily identified.

Previous solutions to alignment and connection difficulties fail to properly address these difficulties. Current devices only lock the component within the overall system. For instance, a current locking system for a component fails to minimize the likelihood of damage to the component or to other components within the overall system. For instance, a user of this type of device may unintentionally insert the component too rapidly thereby damaging the component, communication connectors, or other components within the system prior to utilizing a lock to secure the component in place. Some devices fail to adequately prevent damage and ensure proper component seating. Locks may only engage when the component is positioned in the system.

Therefore, it would be desirable to provide a component housing and electronic device chassis assembly for providing efficient controlled coupling/uncoupling of components within the overall system.

SUMMARY OF THE INVENTION

Accordingly, the present invention is directed to a component carrier and chassis assembly for providing efficient controlled coupling/uncoupling of components to a chassis included in the assembly.

In an aspect of the present invention, a chassis assembly for an electronic device such as a data storage system or the like is described. The assembly includes a carrier for housing a component for integration into the system. The carrier includes a frame constructed to at least partially contain the component electronics. A handle is pivotally coupled to the frame. In embodiments, the handle is rotateable between an engaging orientation and a securing orientation. A pinion portion is included on the handle. The pinion portion may engage with a corresponding rack formed in the chassis to control movement of the carrier with respect to the chassis. A securing mechanism is disposed on an end of the handle opposite the pinion portion. The securing mechanism may be implemented to secure the handle in a securing orientation in which the end of the handle, generally opposite the pinion portion, is disposed adjacent the frame. A securing mechanism, such as a latch, may be included to prevent rotation of the handle with respect to the frame.

In a further aspect of the invention, a method of inserting a component into a computing device is discussed. The method includes the steps of disposing a carrier partially within a chassis for containing a computing device and rotating a handle, pivotally mounted to a frame included in the carrier, to draw the carrier into a seated position within the chassis. A plurality of teeth included in a pinion portion may be utilized to engage a rack included on the chassis so as to slide the carrier into the desired position. In the present method, a latch is utilized to secure the handle to the frame to fix the component carrier within the chassis.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. The principles of the present invention may be utilized in a variety of electronic devices including data storage devices, information handling systems, and the like devices which implement modular sub-components. It is the intention of the present disclosure to encompass and include such variation.

Figure 1:
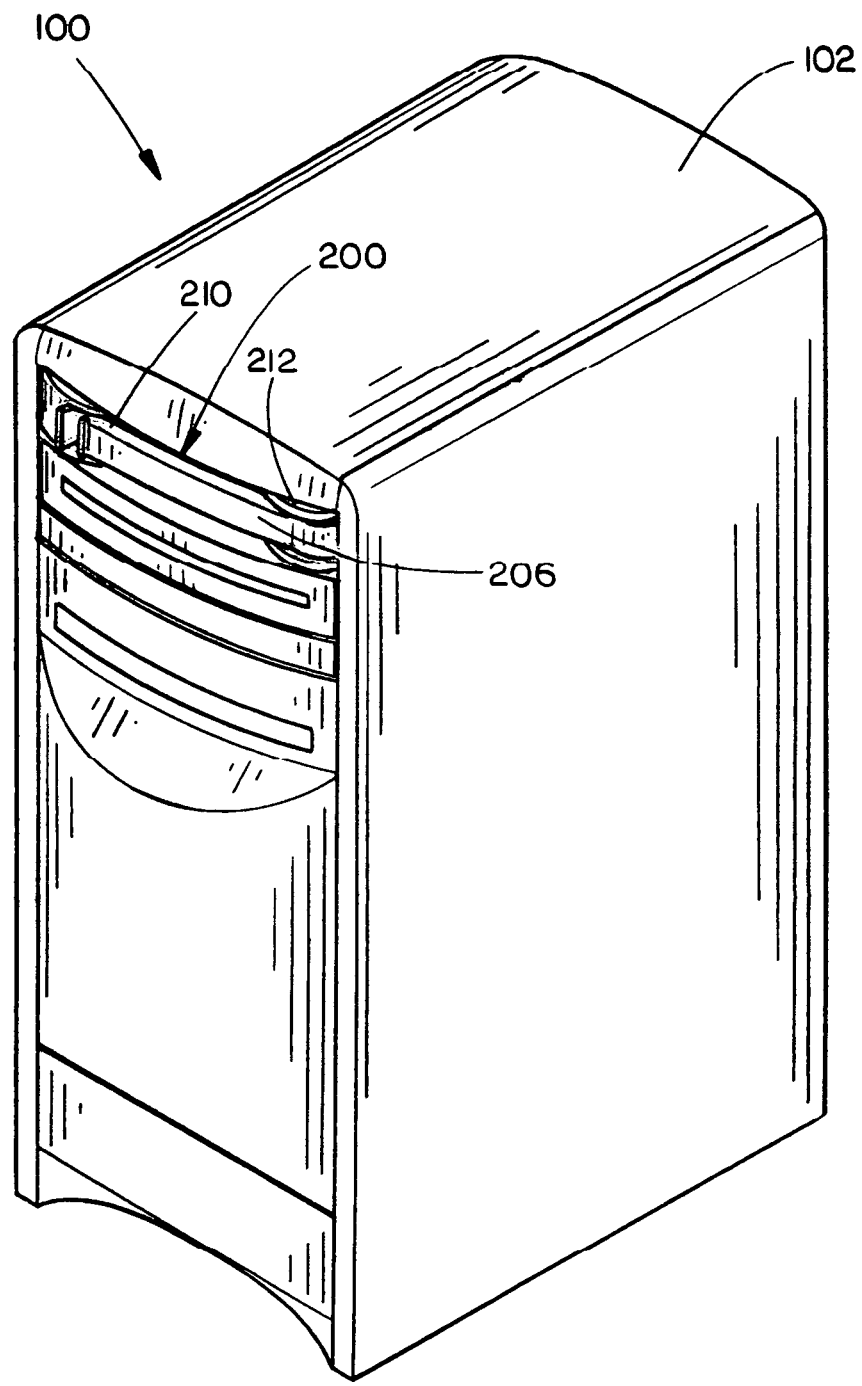
FIG. 1 is an isometric view of a chassis assembly including a drive carrier in accordance with the present invention.
Figure 2:
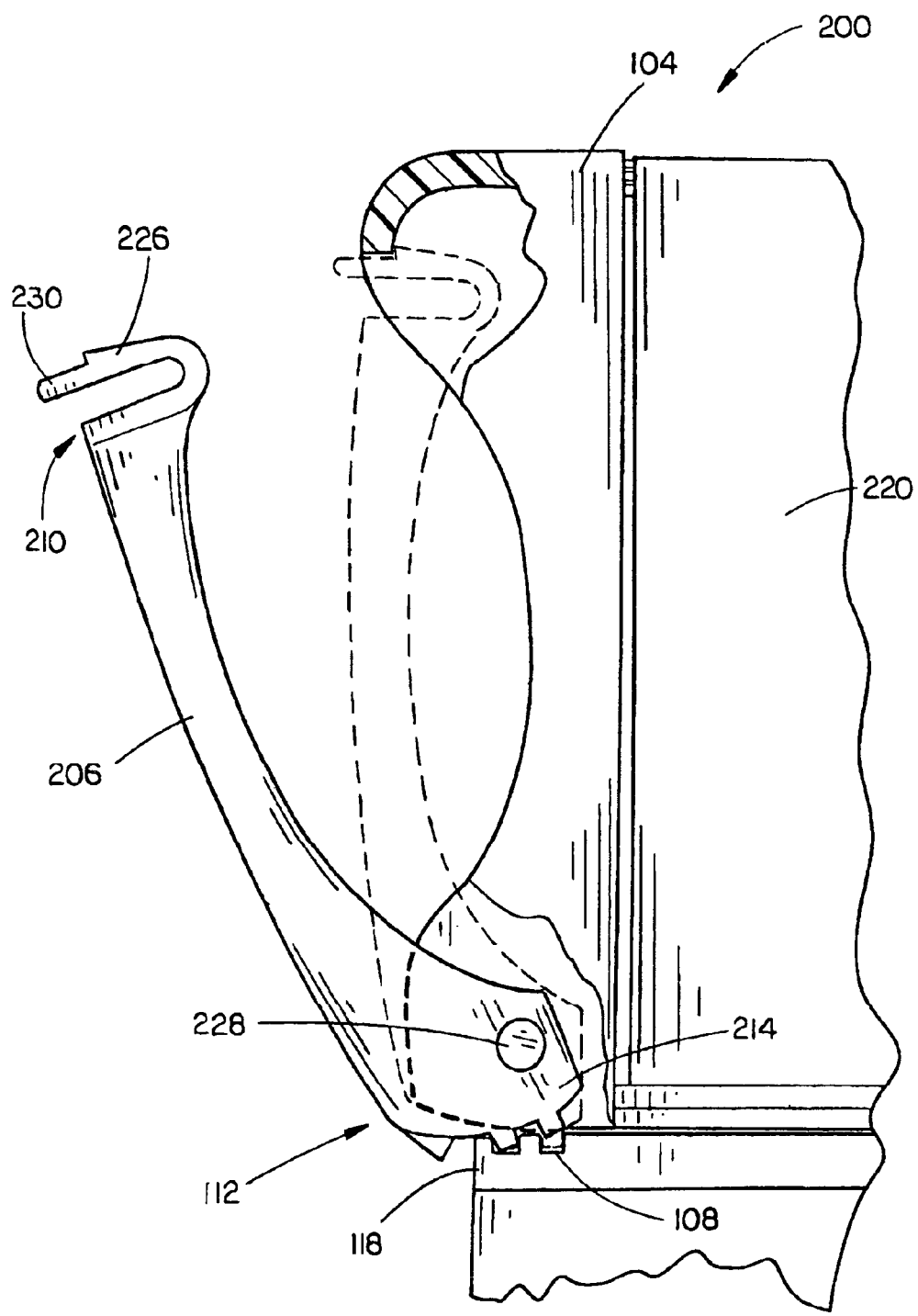
FIG. 2 is a partial cut away view of a drive carrier, including a handle, interacting with a chassis.
Figure 4:
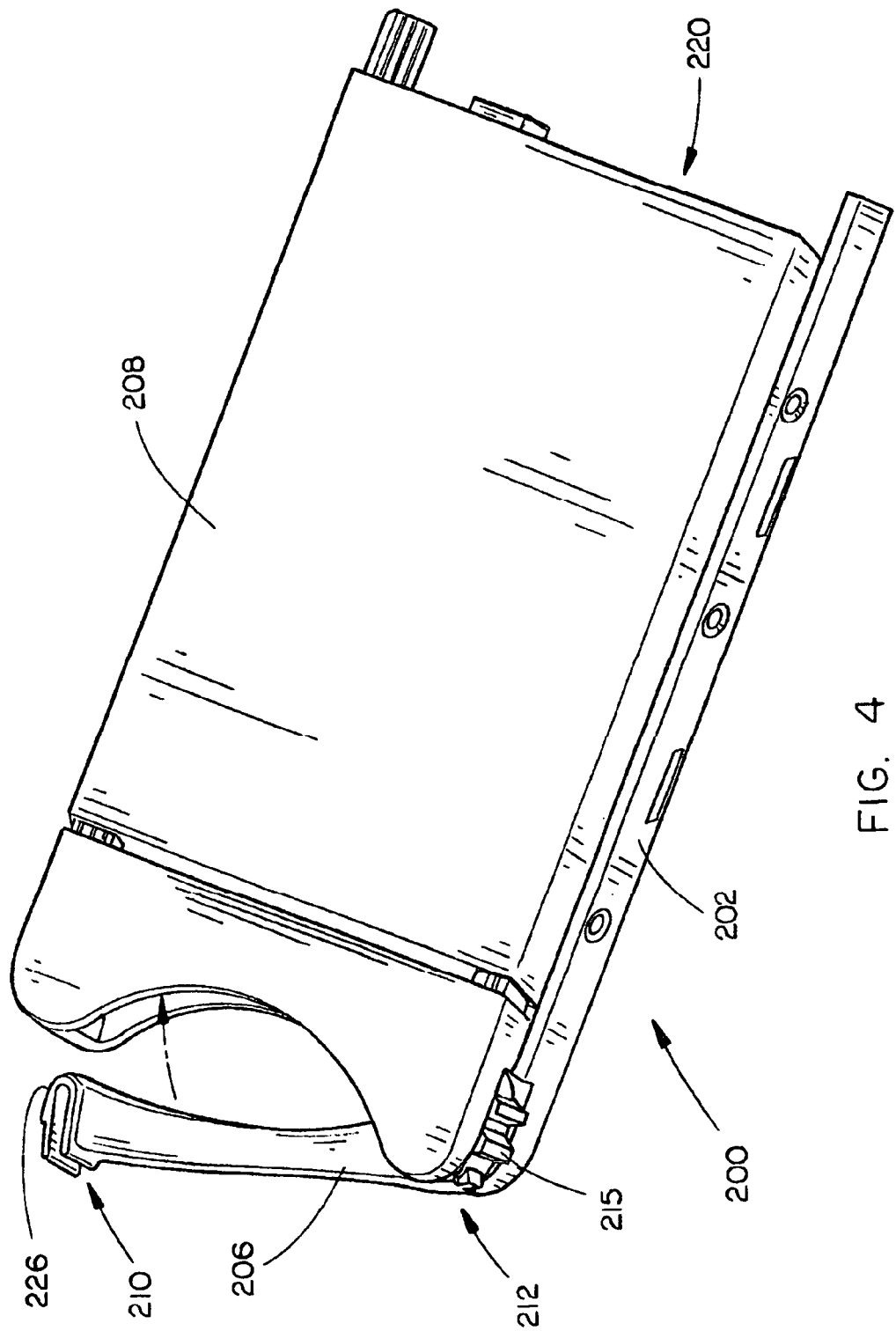
FIG. 4 is an isometric view of a drive carrier in accordance with an aspect of the present invention.

Referring to FIGS. 1, 2, and 4, a chassis assembly 100 including a chassis 102 or enclosure is described. A chassis assembly 100 is suitable for containing electronic devices, data handling systems, computers, data storage devices, information handling systems, and the like. The chassis may be formed of metal, plastic, or other suitable material for providing electromagnetic shielding, protection of the contained device, manufacturing efficiency, and the like. While in the present embodiment the chassis 102 is configured as a desktop form factor, other suitable form factors include rack systems, tower enclosures, or the like. The chassis 100 may be configured with a plurality of bays, or apertures, for receiving various components capable of providing functionality for the electronic device. For instance, a storage drive 200 is received in a bay within chassis 102. Those of skill in the art will appreciate that the number and configuration of bays may vary depending on design preferences, manufacturing considerations, backplane configuration, and the like.

Suitable components include data storage drives, removable media drives, power supplies, batteries, processor modules, and the like for providing a capability to the overall system. The chassis bay may include a rail or groove structure, for receiving a corresponding rail type structure on a component carrier 220 designed to permit sliding reception/component removal. The chassis rail may extend inwardly from adjacent an outer surface, or periphery of the chassis, to permit slide mounting of components.

Electrical/communication couplings may be disposed on the inner portion of the bay opposite the opening in the chassis for coupling a received component to the overall electronic device. A backplane including a series of pins, blades, or the like connectors configured as a plug may be aligned with a drive bay opening, so that a corresponding plug structure on a data storage drive, contained in the drive carrier 220, is communicatively coupled to the overall system. The chassis assembly 100 including carrier 220 may be implemented to ensure effective communicative coupling while minimizing or eliminating the potential for inadvertent damage to the communicative couplings on the component and/or on the electronic system, as well as, damage to the component or the system. The chassis assembly 100 of the present invention may permit a user to perform one-handed final seating of the component in the chassis 102. Unitary rails or separate rails, fixedly secured to the chassis, may be included to receive the component chassis. For instance, separate mounting rails screwed to the chassis permit sliding reception of a component into the chassis. Bays may be covered from the ingress of dust and debris by a "knock out plate" or other structure in the bezel cover until utilization of the bay is necessary.

Referring to FIG. 2, a rack portion is formed in the chassis 102. For instance, a series of spaced apart recesses or apertures 108 are included in a chassis rail 118 for permitting engagement by a pinion. Other suitable structures include wedge shaped structures and the like forming a rack. In further embodiments, the rack is configured to act as a key for preventing connection of a device utilizing a communication connection other than the communication connection for which the bay is configured. For example, the size or shape of the rack portion is constructed to correlate to the communication protocol and connector included in the system thus, preventing connection of a component having an incorrect communication plug. The rack structures extend from the outer portion or periphery of the chassis generally towards the electrical connection to permit controlled seating of the component.

Referring to FIGS. 2 and 4, a component carrier is included in the chassis assembly 100. Component carriers or enclosures are implemented with the electronic device to permit modular construction. For instance, a data storage device is contained within a drive carrier 220 to provide electromagnetic shielding, prevent the ingress of dust and debris, protect the component, permit removal/transport, and the like. The carrier 220 includes a frame 208 or a rigid enclosure for containing the functional portions of the component therein. In the present instance, a rail 202 or bracket may partially define one of the sides of the frame. The carrier rail may include an interlocking structure to engage with the chassis rail to align and mount the carrier in the chassis 102. One side of the carrier, directed towards the exterior of the chassis, may be formed as a decorative bezel cover for a portion of the chassis 102. For example, a bezel cover 104, included in the frame is formed of plastic to provide an aesthetically pleasing cover, as well as, generally integrating with a main bezel cover included on the chassis.

Figure 3:
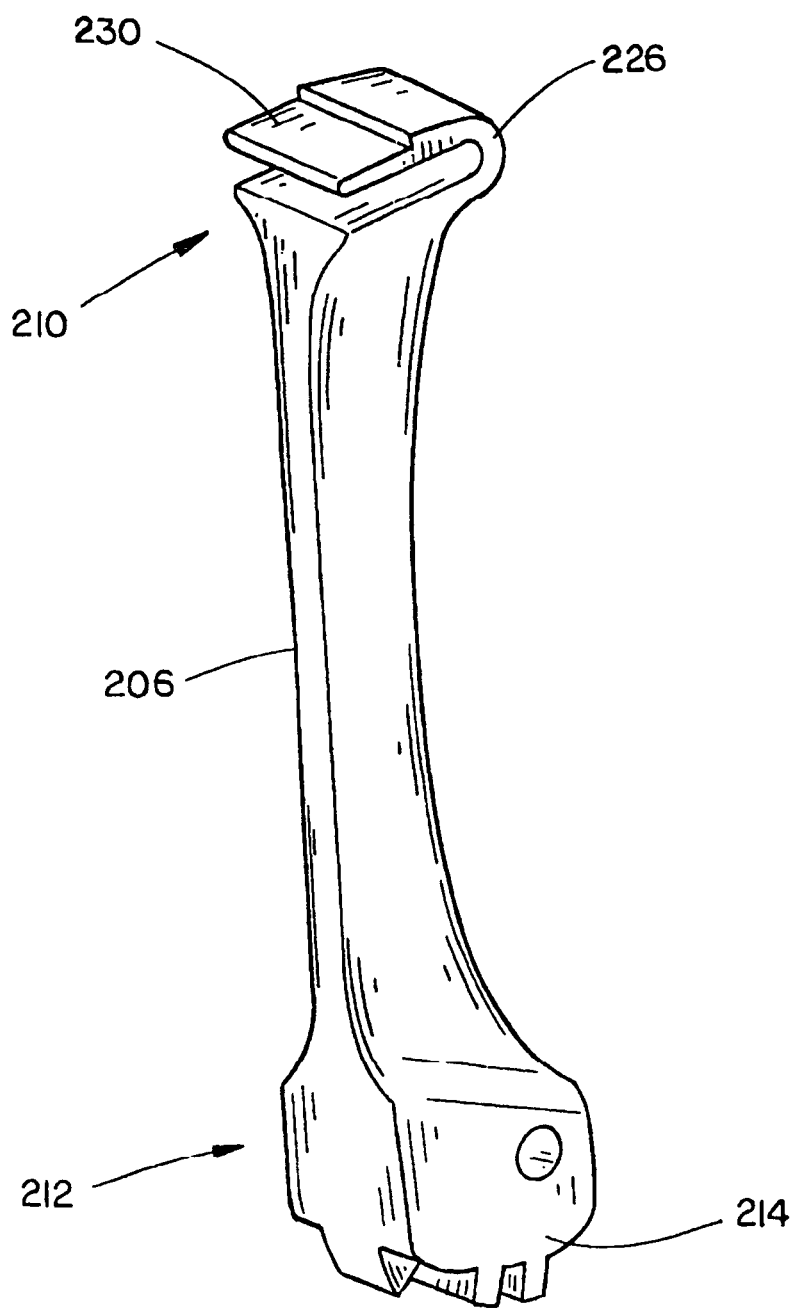
FIG. 3 is an isometric view of a carrier handle in accordance with an aspect of the present invention.

Referring to FIGS. 2 and 3, a handle 206 is pivotally mounted to the frame 208. In an embodiment, the handle 206 is formed of a suitable plastic or combination of polymeric materials offering sufficient rigidity while being pliable if, a unitary latch 226 is included for securing the handle to the frame. In other examples, other materials including fiber reinforced composites, metals, and the like are utilized to form the handle. In the present embodiment, a pair of trunnions included on the bezel of the frame, are captured in corresponding pockets defined by the handle 206. In further instances, a pivot pin or the like is utilized to provide a pivot axis. Those of skill in the art will appreciate that the handle may be mounted directly to other portions of the frame based on design requirements. Other suitable mounting points include folded sheet metal enclosures, bracing or support structures included in the component frame, and the like.

Referring now to FIGS. 2 and 3, the handle includes a first end 212 and a second end 210. The handle 206 may be biased by a spring, or the like, with the second end extending away from the frame. For example, the second end 210 of the handle is biased away from the bezel cover 104 to allow for one handed seating of the component 200 within a chassis. Biasing the second end 210 of the handle away from the frame 208 may prevent inadvertent insertion, as is discussed below. In the current embodiment, the handle 206 is configured to rotate between a first orientation in which a structure on the first end of the handle prevents insertion of the carrier and a second orientation in which a structure on the first end of the handle secures the carrier in the chassis. The second orientation may ensure sufficient engagement between the first end 212 of the handle and a structure included on the chassis, such as a rail 118 thus, securing the communication coupling and preventing movement of the carrier 220 within the chassis.

A pinion portion 214 is included on the first end 212 of the handle. For instance, a plurality of teeth (one tooth 215 is referenced), included in the pinion portion, extend generally radially away from the pivot point of the handle 206. Those of skill in the art will appreciate that only a segment of a pinion may be required to provide sufficient movement of the carrier to seat a component communication plug to a corresponding data handling system plug. For instance, the pinion portion 214 only includes a segment, such as a quadrant, including teeth rather than gearing around the perimeter of the first end to provide measured and controlled seating/removal whereby the carrier is inserted a fixed distance. In the foregoing instance, the number, spacing and configuration of the teeth is dependent on the distance the carrier is designed to travel between a first contact between the pinion and the rack and the final seating position or the secured position of the carrier in the chassis. For example, the distance the carrier is designed to travel may be adjusted by adjusting the configuration of the teeth. With particular reference to FIGS. 2 and 4, the pinion portion 214 may be arranged and configured so that the pinion teeth extend beyond the perimeter of the carrier 220 to engage with a rack portion included on the chassis 102. The teeth may individually engage with apertures 108 (one is referenced) in a chassis rail 118 to permit controlled and measured insertion of the component while minimizing the potential for damage associated with rapid seating of the component. In an embodiment, the pinion portion is configured to prevent full insertion of the component within the chassis unless the handle is manipulated from an engaging orientation towards a secured position. One of the teeth may act as a stop to prevent rapid insertion or seating of the component when the handle is not orientated to permit reception of the carrier. In additional embodiments, the pinion portion may be configured so that a portion of the first end 210 is disposed in line with a portion of the chassis rail 118 or the like when the handle is orientated away from the frame. The foregoing configuration may prevent insertion of the component carrier unless the handle is rotated. In some instances, the first end 212 may be configured to rotate the handle towards an intermediate orientation to aid in utilization of the handle 206 to control drawing of the carrier 220 into the chassis 102 while preventing a substantial force applied to the chassis 102. For example, a curved surface on the first end is configured to partially rotate the handle to align a lead tooth of the pinion with a corresponding structure on the rack.

With specific reference to FIG. 2, when disposed in a second or secured position (as generally indicated by the handle indicated by dashed lines) the pinion may engage the rack portion to fix the position of the carrier with respect to the rack. In this orientation, a securing mechanism may be implemented to prevent pivoting of the handle. In the current embodiment, a latch 226 is disposed on the second end 210 of the handle to restrain pivotal motion. Other suitable securing mechanisms include deforming tabs, thumbscrews, snaps, and the like for restraining pivotal motion of the handle. The latch 226 is configured to slightly deform along the main axis of the handle to allow the latch to engage with the frame of the carrier. Deformation of the latch may be accomplished by implementing a material having sufficient rigidity to allow for utilization as a handle while permitting limited deformation sufficient to allow the latch to function. For example, a detent 230 included in the latch acts as a catch or stop for engaging with a lip included in the bezel cover to positively engage the interior portion of the bezel. In this manner, one or more of the teeth included in the pinion portion 214 may press or engage with the material defining the aperture in the chassis rail 118 to secure the position of the carrier.

Figure 5:
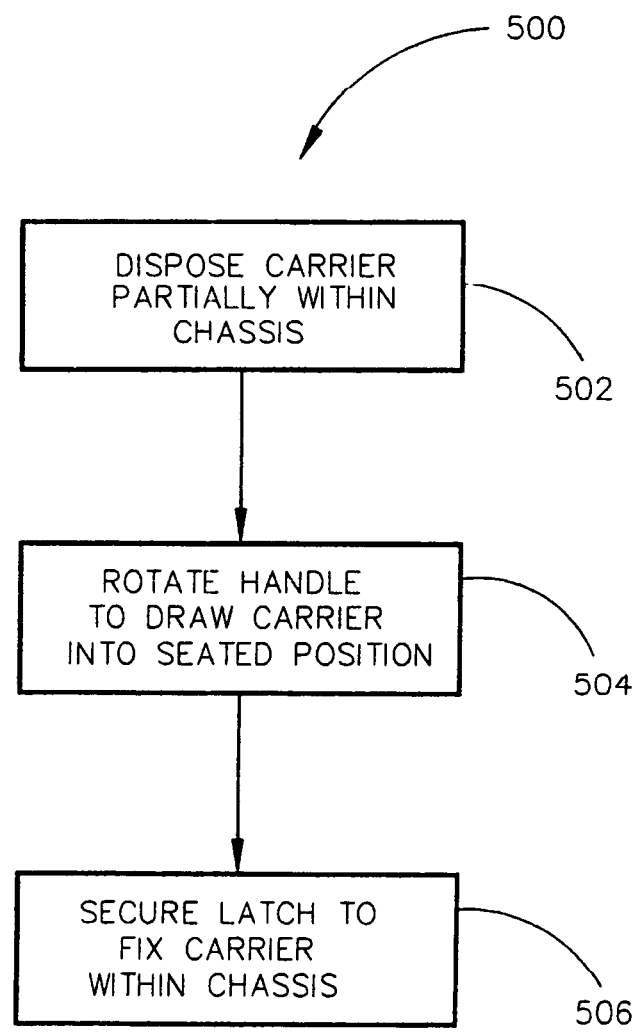
FIG. 5 is a flow diagram illustrating a method in accordance with an aspect of the invention.

Referring to FIG. 5, a method 500 of inserting a component carrier into a computer chassis is discussed. The method 500 includes disposing 502 a carrier partially within the chassis. A handle pivotally mounted to the carrier frame is rotated 504 to draw the component carrier into a seated position within the chassis in a controlled and measured manner. In the current embodiment, movement of the carrier is achieved by implementing a pinion to engage a rack thereby sliding the carrier. Utilizing a pivoting handle to draw the component into a seated position may prevent inadvertent damage to the component/the computer or the connections communicatively coupling the two together. The final position of the carrier within the chassis allows for sufficient connection between communication couplings on the component and, for example, a backplane included in the computing system. A latch included on the handle is utilized to secure 506 the handle to the frame, thus fixing the component within the chassis.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A carrier configured for coupling with a chassis for housing a data handling system, comprising:
    a frame constructed for at least partially housing a component for implementation into the data handling system, the frame including opposing first and second sides, the opposing first and second sides defining opposing first and second planes;
    a handle pivotally coupled to the frame having a rotational axis that is substantially parallel to the opposing first and second planes, the handle having a first end and a second end, the first end including a pinion portion having a plurality of teeth, the pinion portion being positioned adjacent the first side of the frame and opposite the second side of the frame; and
    a deformable latch included on the second end of the handle, the deformable latch being unitarily formed with the handle, the deformable latch being configured for securing the handle to the frame at the second end,
    wherein the pinion portion is configured to extend beyond the first side of the frame to engage with the chassis for housing the data handling system, the pinion portion being configured to control movement of the frame with respect to the chassis, at least a portion of the chassis configured with at least one of a size or a shape correlating to a selected communication connector of the data handling system, the chassis configured to prevent engagement with the pinion portion when the component includes a communication connector that is not configured for connection with the data handling system.

2. The carrier of claim 1, wherein the pinion portion is configured to rotate between a first engaging orientation and a second secured orientation.

3. The carrier of claim 1, wherein the handle is biased towards a first engaging orientation.

4. The carrier of claim 1, wherein at least two teeth included in the plurality of teeth are configured to sequentially engage with the chassis when rotating between an engaging orientation and a secured orientation.

5. The carrier of claim 1, wherein rotation of the handle is proportional to the movement of the frame with respect to the chassis.

6. The carrier of claim 1, wherein the pinion is configured and arranged to prevent insertion of the carrier into the chassis unless the handle is rotated towards a secured orientation.

7. A chassis assembly for a data handling system, comprising:
   a chassis for housing the data handling system, the chassis including a rack portion; and
   a component carrier including:
      a frame constructed for at least partially housing a component for implementation into the data handling system, the frame including opposing first and second sides, the opposing first and second sides defining opposing first and second planes;
      a handle pivotally coupled to the frame having a rotational axis that is substantially parallel to the opposing first and second planes, the handle having a first end and a second end, the first end including a pinion portion having a plurality of teeth, the pinion portion being positioned adjacent the first side of the frame and opposite the second side of the frame; and
      a deformable latch included on the second end of the handle, the deformable latch being unitarily formed with the handle, the deformable latch being configured for securing the handle to the frame at the second end,
   wherein the pinion portion extends beyond the first side of the frame to engage with the rack portion of the chassis to control at least one of seating of the component carrier in the chassis or removal of the component carrier from the chassis, the rack portion configured with at least one of a size or a shape correlating to a selected communication connector of the data handling system, the rack portion configured to prevent engagement with the pinion portion when the component includes a communication connector that is not configured for connection with the data handling system.

8. The chassis assembly of claim 7, wherein the pinion portion is configured to rotate between an engaging orientation wherein a first tooth of the plurality of teeth engages with the rack portion to prevent insertion of the component carrier and a secured orientation wherein the securing mechanism is engageable with the frame.

9. The chassis assembly of claim 7, wherein the handle is biased towards an engaging orientation.

10. The chassis assembly of claim 7, wherein at least two teeth included in the plurality of teeth are configured to sequentially engage with the chassis when rotating between a first orientation and a second orientation in which the carrier is secured in the chassis.

11. The chassis assembly of claim 7, wherein rotation of the handle is proportional to the movement of the component carrier with respect to the chassis.

12. The chassis assembly of claim 7, wherein the frame is configured to prevent user grasping of the component carrier adjacent a securing orientation.

13. The chassis assembly of claim 7, wherein the rack portion defines a plurality of apertures configured to individually receive an individual tooth of the plurality of teeth included on the pinion portion.

14. The chassis assembly of claim 7, wherein at least two teeth included in the plurality of teeth are configured to sequentially engage with the rack portion of the chassis when rotating between an engaging orientation and a secured orientation.

15. The chassis assembly of claim 7, wherein pinion is configured and arranged to prevent insertion of the carrier into the chassis unless the handle is rotated towards a secured orientation.

16. A computer chassis assembly, comprising:
   a chassis for housing the computer, the chassis including a rail for receiving a component, the rail defining a plurality of apertures extending from adjacent an exterior of the chassis towards an interior of the chassis; and
   a component carrier, for containing the component, the component carrier including:
      a frame constructed for at least partially housing the component for implementation into the computer, the frame including opposing first and second sides, the opposing first and second sides defining opposing first and second planes;
      a handle pivotally coupled to the frame having a rotational axis that is substantially parallel to the opposing first and second planes, the handle having a first end and a second end, the first end including a pinion portion having a plurality of teeth, the handle being rotateable to permit the second end to rotate towards and away from the frame, the pinion portion being positioned adjacent the first side of the frame and opposite the second side of the frame; and
      a deformable latch included on the second end of the handle, the latch being configured for securing the handle to the frame,
   wherein the pinion portion includes at least one tooth included in the plurality of teeth for preventing insertion of the component carrier, unless the handle is rotated, the pinion portion being configured to extend beyond the first side of the frame to engage with the plurality of apertures, the handle being rotateable to selectively engage the pinion with the plurality of apertures to draw the component carrier into the chassis when the second end of the handle is rotated towards the frame, the plurality of apertures configured with at least one of a size or a shape correlating to a selected communication connector of the data handling system, the chassis configured to prevent engagement with the pinion portion when the component includes a communication connector that is not configured for connection with the data handling system.

17. The computer chassis assembly of claim 16, wherein the deformable latch is unitarily formed with the handle.

18. The computer chassis assembly of claim 16, wherein rotation of the handle is proportional to the movement of the component carrier with respect to the chassis.

* * * * *